(No Model.) 2 Sheets—Sheet 1.

W. C. REUTER.
BIBLE WHEEL.

No. 601,383. Patented Mar. 29, 1898.

Witnesses:-
Louis M. F. Whitehead
H. F. Bernhof

Inventor:-
William C. Reuter
By his Attorneys,-
C. A. Snow & Co.

(No Model.)  2 Sheets—Sheet 2.

W. C. REUTER.
BIBLE WHEEL.

No. 601,383. Patented Mar. 29, 1898.

Witnesses:—
Louis M. F. Whitehead.
H. F. Bemborf

Inventor:—
William C. Reuter
By his Attorneys,
C. A. Snow & Co.

UNITED STATES PATENT OFFICE.

WILLIAM CHARLES REUTER, OF WALLA WALLA, WASHINGTON.

BIBLE-WHEEL.

SPECIFICATION forming part of Letters Patent No. 601,383, dated March 29, 1898.

Application filed September 13, 1897. Serial No. 651,520. (No model.)

*To all whom it may concern:*

Be it known that I, WILLIAM CHARLES REUTER, a citizen of the United States, residing at Walla Walla, in the county of Walla Walla and State of Washington, have invented a new and useful Bible-Wheel, of which the following is a specification.

My invention relates to a game or game apparatus in which I have combined with an amusing structure certain useful information relating to the Bible which will tend to provide instruction and promote interest in the study of the Bible.

The object that I have in view is to provide an amusing game which will also be instructive to the players, and the new game may also be played by children as well as by older people in order to interest as well as instruct children in the study of the Bible.

To the accomplishment of these ends my invention consists in a game apparatus which I prefer to call a "Bible game," comprising a board common to all the players and individual boards for two or more of the players. In general terms the common and the individual game-boards are similarly inscribed; but the common game-board contains a series of removable sections and a revoluble pointer or indicator adapted to spin on a central pivot and to point to any one of the removable sections or spokes, to be appropriated by the player who turned the hand, and to be placed by him in a marked space on his individual game-board.

The invention further consists in the novel construction and arrangement of parts which will be hereinafter fully described and claimed.

To enable others to understand my invention, I have illustrated the preferred embodiment thereof in the accompanying drawings, forming a part of this specification, and in which—

Figures 1, 2:
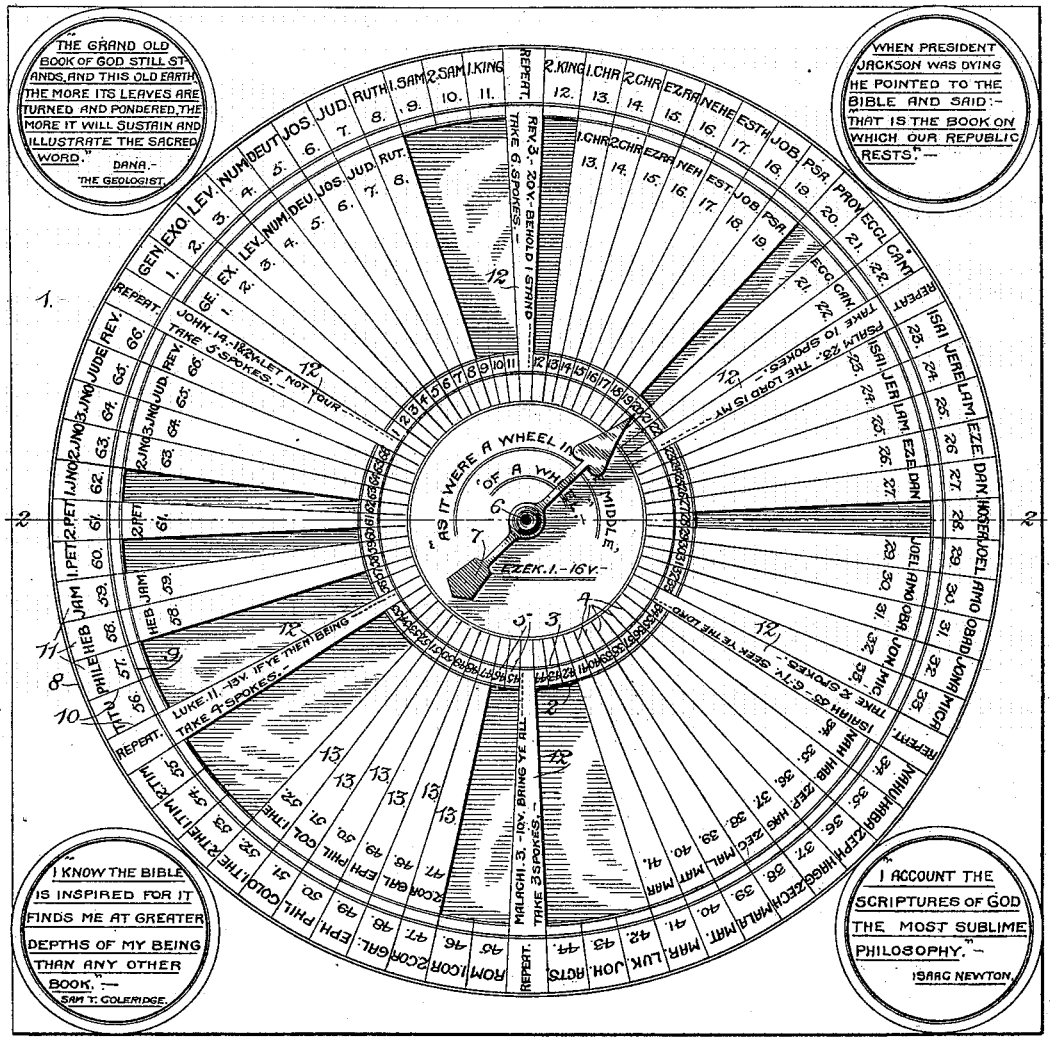
Figures 3, 4:
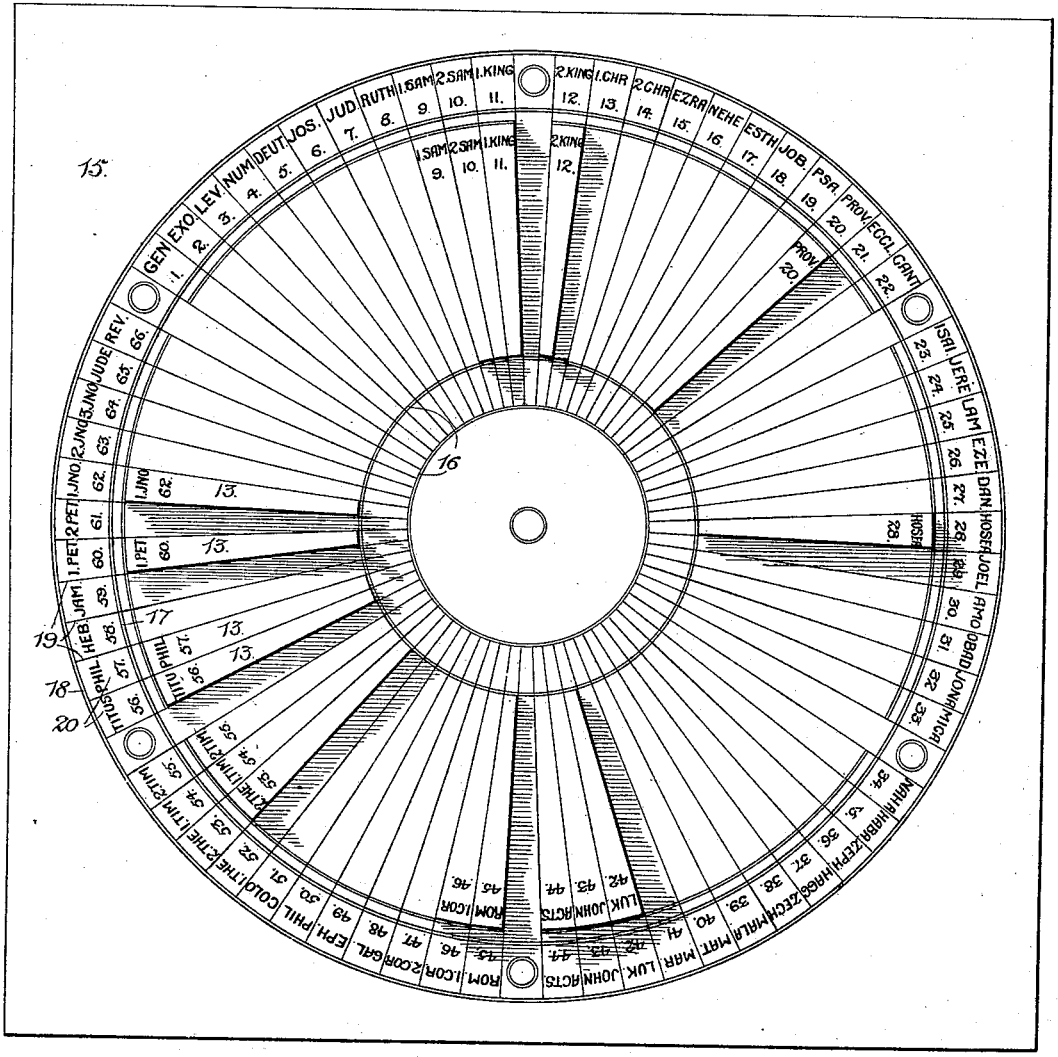

Figure 1 is a plan view of the game-board with the removable spokes or sections and the revoluble pointer which is to be used in common by all the players. Fig. 2 is a vertical sectional view on the plane indicated by the dotted line 2 2 of Fig. 1. Fig. 3 is a plan view of one of the individual game-boards to be used by the player in positioning the spokes or removable sections appropriated or conquered by him from the common board or any one of his opponents. Fig. 4 is a detail view of one of the spokes or removable sections, showing it inverted or reversed from the position it occupies in the common game-board in order to disclose to view thereon the inscription.

Like numerals of reference denote corresponding parts in all the figures of the drawings, referring to which—

1 designates the game-board to be used in common by all the players participating in the game, and in order to distinguish this game-board from the other boards used by the individual players I will hereinafter refer to or designate this board 1 as the "common" game-board. This game-board 1 is constructed in a novel manner to somewhat resemble a wheel in which the spokes are removable. At the center of the common game-board are inscribed the concentric circles 2 and 3, the space between which is divided by radial lines 4 into a series of segments 5, corresponding in number to the sixty-six books of the Bible, each of the segments 5 being numbered from "1" to "66," inclusive. Centrally within the circles 2 3 is a pivot 6, on which is mounted the revoluble hand or pointer 7, which is adapted to be rotated rapidly by the players and to stop opposite to one of the sixty-six sections 5 of the circles 2 3. Outside of the inner circles 2 3 and concentric with the latter are the outer circles 8 9, which are divided by radial lines 10 into a series of segments 11, the radial division-lines 4 of the inner circles corresponding to and alining with the radial division-lines 10 of the outer circles, whereby the segments 11 of the outer circles correspond to the segments 5 of the inner circles. These segments 11 of the outer circles are numbered correspondingly to the segments of the inner circles from "1" to "66," inclusive, and said outer series of segments contain inscriptions in the form of abbreviations denoting the various books of the Bible, as clearly indicated in the drawings.

The spaces between the inner and outer rows of circles is partially divided on lines radial to the circles to provide a large number of removable segments or, as they may be called, "spokes;" but certain portions of the board between the inner and outer circles remain as integral parts of the board, in order to join the central part or hub with the rim and to maintain this central part in permanent immovable relation to the rest of the game-board. The permanent or immovable sections or spokes of the common game-board are designated at 12 in Fig. 1, and they are arranged equidistant from each other. I have shown a series of six of these immovable spokes or sections 12 to provide a corresponding number of arc-shaped open spaces between the immovable sections or spokes 12, and these open spaces are filled with a plurality of removable sections or spokes 13. Although I have shown a series of six immovable sections or spokes 12, I do not strictly limit myself to this particular number of immovable spokes, because the number can be varied or changed without departing from the spirit of my invention.

The removable sections or spokes 13 are fitted in the arc-shaped openings or spaces bounded by the inner and outer circles and the immovable sections 12, and these removable spokes are arranged in compact order in edgewise relation to each other and to the common game-board. The spokes are of tapering form, as shown by Fig. 4, so that they have narrow inner ends and broader outer ends, and thus the spokes are adapted to be assembled together within the openings in the game-board to have their inner ends register with the segments or spaces 5, while their outer ends register with the segments or spaces 11, whereby the removable spokes are adapted to form continuations of the radial lines which divide the inner and outer circles. These removable spokes 13 are numbered from "1" to "66," inclusive, corresponding with the plurality of segments 5 and 11 of the inner and outer circles, and I prefer to also provide said removable spokes with abbreviations denoting the books of the Bible and corresponding to the abbreviations in the outer series of segments or spaces 11. These removable spokes are provided on one of their sides or faces with suitable inscriptions appropriate to the contents of the respective books of the Bible which the various spokes represent, and in Fig. 4 of the drawings I have shown one of the spokes 13 inverted or reversed, in order to expose to view its inscriptions. This view, Fig. 4, shows the spoke numbered "44" representing the book of Acts, and on its face which, when the spoke is placed in position, is concealed from view is provided the inscription consisting of three phrases, the first of which represents the date of the events chronicled by the book, the second the principal events, and the third the chief characters portrayed in the book. While these inscriptions are used on each and all of the removable spokes, it is not strictly essential that the inscriptions shall be of the character which I have shown as illustrative of this part of my invention, and I would therefore have it understood that the inscriptions may be varied within wide limits without departing from the spirit of the invention.

Each of the immovable or permanent sections 12 of the game-board 1 is provided with an inscription denoting a particular passage or verse from one of the books of the Bible, and also with a phrase denoting one of the rules or instructions by which the playing of the game is governed. As one example of my invention the permanent section at the lower half of the common game-board is inscribed with a phrase denoting the tenth verse of the third chapter of Malachi and with the instruction to take three spokes. The utility of this is that in the event of the pointer stopping opposite the immovable section or spoke with the inscription, and in the event that the player who spins the pointer is able from memory to repeat the verse called for by the inscription, he may appropriate three spokes either from the common game-board 1 or from either of his opponents, which may be required to complete the player's wheel on his individual game-board.

The individual game-board to be used by each of the players is shown by Fig. 3 with a number of the removable spokes in position thereon. Each individual game-board has inner circles 16, one or more in number, and concentric outer circles 17 18, and the said individual board (designated at 15) is furthermore provided with radial division-lines 19, which cut through the inner and outer circles and serve to divide the outer circles into a plurality of segments 20. These segments 20 of the board 15 are numbered and inscribed correspondingly to the common game-board, the segments being numbered from "1" to "66," inclusive, and having inscriptions forming the abbreviations of the books of the Bible. The individual game-board 15 thus constructed or inscribed serves as a guide to the player in properly placing the spokes appropriated by him from the common board 1 or conquered from his opponents.

To play the game, the removable spokes 13 are placed in proper order on the common game-board 1, and each of two players takes one of the individual game-boards. Two or more persons may play the game, and if three or four persons participate extra sets of spokes should be provided to be used by the extra players. Each player is entitled to spin the pointer or indicator once, except under some circumstances, and the players take turns in spinning the pointer. The pointer must make at least a complete revolution to make a fair spin. If the arrow or indicator points to a spoke numbered "62," marked "I Jno.," the player appropriates the spoke and places it in proper position on his individual game-board and in alinement with the correspondingly numbered and marked space thereon, as shown by Fig. 3. Then the next player turns the indicator, and he takes the spoke to which the arrow points and places it on his individual game-board, and so on.

Should the arrow stop opposite to one of the permanent sections or spokes 12—as, for instance, opposite to the spoke marked "Isaiah, 55, 6-7 verses"—the player is called upon to repeat from memory the two verses of the chapter thus designed. If he is able to do so, the player may take from the game-board 1 or from his opponent any two spokes he may require to fill the wheel inscribed on his individual game-board; but if the pointer stops opposite any of the other permanent sections 12 the player may take the number of spokes indicated thereon, subject, however, to the condition that he is able to repeat the passage called for by the inscription on the spoke or section 12. If the pointer stops opposite to a vacant space the spoke in which is in possession of the player who spins the pointer, the player is entitled to again turn the indicator or pointer. Should the pointer stop opposite to a vacant space the spoke in which is in possession of his opponent, the player is entitled to appropriate the said spoke on the condition that he is able to give the substance, in a substantially correct form, of the inscription on the concealed side of the spoke that he desires to conquer from his opponent, and under these circumstances the winning player is entitled to another turn of the pointer, but to one only, even if he should be able to conquer a second spoke from his opponent. Should the arrow stop opposite to one of the radial division-lines, nothing is gained, and the next player turns the pointer. In case three or more persons participate the extra set or sets of spokes should be used; but they should not be placed in the game-board 1 until the original set of spokes shall have become exhausted therefrom.

Children may play the game by omitting the requirement for the quotation of passages from the Scriptures and the inscriptions on the backs of the removable spokes, since it is difficult for children to quote scriptural passages. As some people are not able to correctly remember and quote dates, players on agreement may dispense with the requirement for citation of the dates on the reverse sides of the removable spokes.

When the arrow points to one of the permanent spokes and the player quotes the passage called for thereby, he is not required to quote the inscription on the back or concealed face of the spoke which he desires to take from his opponent.

My improved game provides a very interesting and instructive amusement for old and young people, and it is very instructive to children in promoting the study of the Scriptures.

The game may be manufactured very cheaply, and it can be placed on the market in very attractive form.

It is evident that changes in the form and proportion of parts and in the arrangement of the parts may be made without departing from the spirit or sacrificing the advantages of my invention, and I therefore reserve the right to make such modifications as fairly fall within the scope of the invention.

The corners of the game-board, as well as the central space thereon, may be provided with suitable inscriptions.

Having thus fully described my invention, what I claim as new, and desire to secure by Letters Patent, is—

1. A game-board provided with a series of removable sections or spokes each having, on its concealed face, an inscription to be recited by the player before appropriation and removal of said section or spoke from the game-board, substantially as and for the purposes described.

2. A game-board provided with a series of permanent sections or spokes, each having an inscription on its face, and a regulation directing the removal of one or more sections or spokes, and said permanent sections or spokes assembled to provide openings or spaces between themselves, and a plurality of removable spokes or sections fitted to the game-board in the spaces between the permanent spokes or sections thereof, substantially as and for the purposes specified.

3. In a game apparatus, a game-board provided with a series of spaced permanent sections or spokes arranged to leave openings or spaces between them, and each permanent section or spoke containing a suitable inscription, a pointer mounted centrally upon the board, and a plurality of removable sections or spokes to be assembled in the spaces between the permanent sections, and each of said removable sections or spokes provided on one face thereof with suitable inscription or inscriptions, as and for the purposes described.

4. In a game apparatus, a game-board provided with a series of spaced permanent sections or spokes and with segmental spaces opposite to the openings between said permanent spokes or sections, a plurality of removable spokes or sections fitted in the spaces between the permanent sections and opposite to, or in alinement with, the segmental spaces of the game-board, and a pointer to indicate the segmental spaces, as and for the purposes described.

5. A game apparatus comprising a game-board to be used in common by all the players and provided with the numbered and inscribed segmental spaces, the indicator, and the spaced permanent sections or spokes; individual game-boards each having its surface inscribed by circles and radial lines to provide segmental spaces corresponding to those of the common game-board; and a series of removable spokes or sections assembled in order in the openings of the common game-board, between the permanent spokes therein, opposite to the inscribed and numbered segments thereof, and adapted to be removed by the players from the common game-board to their respective individual game-boards; each permanent spoke of the common game-board having a suitable inscription, and the removable spokes each having, on its concealed face, an inscription or inscriptions, as and for the purposes described.

In testimony that I claim the foregoing as my own I have hereto affixed my signature in the presence of witnesses.

WILLIAM CHARLES REUTER.

Witnesses:
D. M. RADER,
E. W. WHEELER,
F. B. WHEELER.